(12) United States Patent
Matsuyama et al.

(10) Patent No.: US 9,105,939 B2
(45) Date of Patent: Aug. 11, 2015

(54) BATTERY WITH BATTERY ELECTRODE AND METHOD OF MANUFACTURING SAME

(75) Inventors: Chiduru Matsuyama, Yokohama (JP); Hideaki Horie, Yokosuka (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 601 days.

(21) Appl. No.: 12/920,493

(22) PCT Filed: Mar. 9, 2009

(86) PCT No.: PCT/IB2009/000458
§ 371 (c)(1), (2), (4) Date: Sep. 1, 2010

(87) PCT Pub. No.: WO2009/112920
PCT Pub. Date: Sep. 17, 2009

(65) Prior Publication Data
US 2011/0014521 A1 Jan. 20, 2011

(30) Foreign Application Priority Data

Mar. 10, 2008 (JP) ................. 2008-059999
Nov. 26, 2008 (JP) ................. 2008-301157

(51) Int. Cl.
| | | |
|---|---|---|
| *H01M 10/0525* | (2010.01) | |
| *H01M 4/04* | (2006.01) | |
| *H01M 4/131* | (2010.01) | |
| *H01M 4/136* | (2010.01) | |
| *H01M 4/1391* | (2010.01) | |
| *H01M 4/1397* | (2010.01) | |
| *H01M 4/62* | (2006.01) | |
| *H01M 4/485* | (2010.01) | |
| *H01M 4/58* | (2010.01) | |

(52) U.S. Cl.
CPC ........ *H01M 10/0525* (2013.01); *H01M 4/0404* (2013.01); *H01M 4/131* (2013.01); *H01M 4/136* (2013.01); *H01M 4/1391* (2013.01); *H01M 4/1397* (2013.01); *H01M 4/621* (2013.01); *H01M 4/622* (2013.01); *H01M 4/623* (2013.01); *H01M 4/485* (2013.01); *H01M 4/5825* (2013.01); *Y02E 60/122* (2013.01); *Y02T 10/7011* (2013.01)

(58) Field of Classification Search
CPC ..... H01M 4/621; H01M 4/622; H01M 4/623; H01M 4/0404; H01M 10/0525
USPC ............. 429/212, 217, 231.95; 29/623.5
See application file for complete search history.

(56) References Cited

U.S. PATENT DOCUMENTS

| | | |
|---|---|---|
| 6,660,680 B1 * | 12/2003 | Hampden-Smith et al. .. 502/180 |
| 6,998,191 B2 | 2/2006 | Shindo et al. |
| 2003/0035995 A1 | 2/2003 | Ohsaki et al. |

(Continued)

FOREIGN PATENT DOCUMENTS

| | | |
|---|---|---|
| CN | 1847353 A | 10/2006 |
| CN | 101107281 A | 1/2008 |

(Continued)

Primary Examiner — Ula C Ruddock
Assistant Examiner — Thomas Parsons
(74) Attorney, Agent, or Firm — Young Basile

(57) ABSTRACT

The invention provides a battery electrode capable of improving a lifespan characteristic (cycle characteristic at the time of high temperature endurance). The battery electrode has a collector and an active material layer formed on a surface of the collector. The active material layer includes a plurality of binders having different specific gravities. The binders are more present at the collector side of the active material layer.

13 Claims, 6 Drawing Sheets

(56) References Cited

U.S. PATENT DOCUMENTS

| | | |
|---|---|---|
| 2003/0054243 A1 | 3/2003 | Suzuki et al. |
| 2003/0068555 A1* | 4/2003 | Naruoka .................... 429/231.4 |
| 2006/0099505 A1* | 5/2006 | Fujino et al. ................. 429/217 |
| 2006/0235144 A1 | 10/2006 | Hwang et al. |
| 2008/0292969 A1 | 11/2008 | Mori et al. |
| 2009/0004566 A1 | 1/2009 | Shirane et al. |

FOREIGN PATENT DOCUMENTS

| | | | |
|---|---|---|---|
| CN | 101312257 A | | 11/2008 |
| GB | 1264009 | * | 2/1972 |
| JP | 9-082364 | | 3/1997 |
| JP | 9-213337 | | 8/1997 |
| JP | 9-259890 | | 10/1997 |
| JP | 11-273665 | | 10/1999 |
| JP | 2001-266890 A | | 9/2001 |
| JP | 2002-050405 A | | 2/2002 |
| JP | 2002-093420 A | | 3/2002 |
| JP | 2003-151556 A | | 5/2003 |
| JP | 2003-331827 A | | 11/2003 |
| JP | 2006-294615 A | | 10/2006 |
| JP | 2007-012559 A | | 1/2007 |
| JP | 2007109628 | * | 4/2007 |
| JP | 2007-128660 A | | 5/2007 |
| JP | 2008-293719 A | | 12/2008 |
| WO | 2007069389 A1 | | 6/2007 |
| WO | WO2009117868 | * | 10/2009 |

* cited by examiner

BATTERY WITH BATTERY ELECTRODE AND METHOD OF MANUFACTURING SAME

CROSS-REFERENCE TO RELATED APPLICATIONS

This application claims priority from Japanese Patent Application Serial Nos. 2008-059999, filed Mar. 10, 2008, and 2008-301157, filed Nov. 26, 2008, each of which is incorporated herein in its entirety by reference.

TECHNICAL FIELD

The present invention generally relates to a battery electrode, a battery using the battery electrode and a method of manufacturing the same.

BACKGROUND

Recently, there has been a strong demand to reduce carbon dioxide emissions in order to suppress global warming. The automobile industry expects that the introduction of Electric Vehicles (EV) or Hybrid Electric Vehicles (HEV) will lead to a reduction in carbon dioxide emissions. Thus, automobile manufacturers have been vigorously developing a motor driving secondary battery, that is, a battery for driving an electrical motor, such that EV or HEV vehicles can be utilized in a practical manner.

In particular, a lithium-ion secondary battery, which exhibits the highest theoretical energy level among all types of batteries, has been deemed the most suitable motor driving secondary battery. Thus, the lithium-ion secondary battery has been rapidly developed. Generally, the lithium-ion secondary battery is configured such that a cathode and an anode having an active material layer, which is formed by coating an active material with a binder on a collector, are connected via an electrolyte layer. The cathode and anode so connected are contained in a battery case.

For example, Japanese Laid-Open Patent Publication No. (Hei) 8-106897 discloses a technique for improving the binder contained in the active material layer of the electrode. More specifically, the technique taught therein forms a mixture paste by using polytetrafluoroethylene (PTFE) resin, polyvinylidene fluoride (PVDF) resin or polyvinylidene chloride (PVDC) resin together as a binder in addition to $LiNiO_2$ and a conductive agent. That technique intends to evenly disperse the PTFE resin in a cathode mixture by using at least two types of resins selected from the above combination as a binder in the active material layer. Further, it seeks to improve the bonding property of a metallic foil (collector) and the active material layer by employing the PVDF resin or PVDC resin.

BRIEF SUMMARY

Thus, the present invention is directed to providing a battery electrode, which can improve the lifespan characteristic (cycle characteristic).

The battery electrode of the present invention has a collector and an active material layer, which is formed on a surface of the collector. Further, the active material layer includes a plurality of binders having different specific gravities. Also, the binders are more present at the collector side in the active material layer.

According to the present invention, a battery electrode is provided that can improve the adhesiveness between the active material and the collector as well as the lifespan characteristic (cycle characteristic).

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
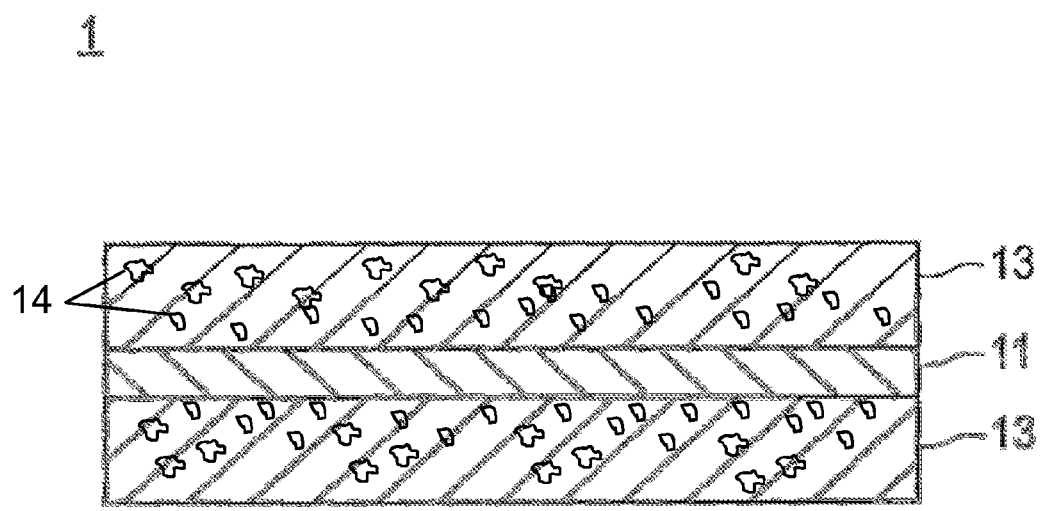
FIG. 1 is a cross-sectional view of a battery electrode in accordance with one embodiment of the invention.

The electrode described in Japanese Laid-Open Patent Publication No. (Hei) 8-106897 is undesirable in a battery used as a power source for driving a vehicle because it cannot exhibit a lifespan characteristic (cycle characteristic), that is, secondary batteries incorporating such an electrode cannot exhibit a high output for a long period of time needed for EV and HEV vehicle applications.

In contrast, the invention teaches a battery with an electrode having an improved lifespan and/or durability.

Hereinafter, certain embodiments of the invention are explained.

First, a structure of the battery electrode according to an embodiment of the invention is explained with reference to the drawings. The drawings are somewhat exaggerated in order to easily explain the features. However, it is expressly noted herein that the technical scope of the invention should not be limited to the drawings. Also, the invention may include other embodiments in addition to those disclosed in the drawings.

Hereinafter, an electrode 1 shown in FIG. 1 will be explained generally as a cathode for a lithium-ion secondary battery. However, the electrode of this and other embodiments may be an anode. In such a case, an anode active material is used as an active material instead of a cathode active material. Further, the battery electrode taught herein may be used for batteries (e.g., NiMH battery).

The electrode 1 has a cathode collector 11 and a cathode active material layer 13, which is formed on a surface of the cathode collector 11. Hereinafter, although elements for constituting the battery electrode in accordance with the present embodiment are explained in a particular sequence, it should be noted that the technical scope of the invention is not limited to such a construction.

The collector 11 is a member for electrically bonding the active material layer 13 and the outside. The collector 11 is formed from conductive materials such as an aluminum foil, a copper foil, stainless (SUS) foil and the like. For a cathode, the collector 11 is preferably formed from aluminum. For an anode, the collector 11 is preferably formed from copper. A thickness of the collector 11 is generally within a range from 1 to 30 μm. However, a collector having a thickness outside such a range may be used.

A size of the collector 11 is determined depending on a usage of the lithium-ion secondary battery. For a large-sized electrode used in a large-sized battery, the collector 11 has a large area. For a small-sized electrode, the collector 11 has a small area.

Figure 2:
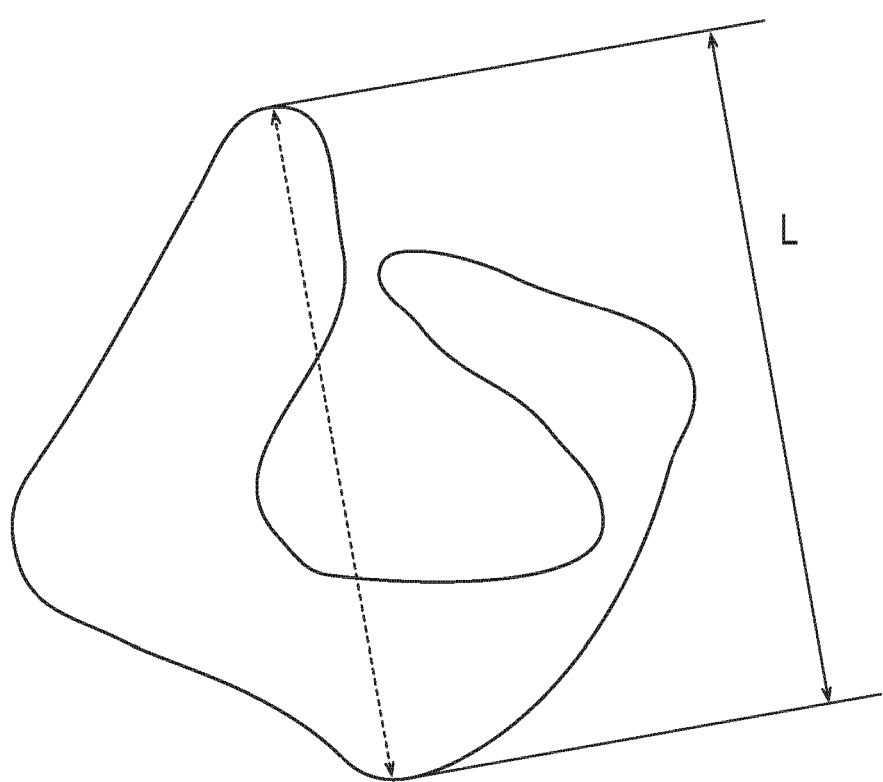
FIG. 2 shows an absolute maximum length used when measuring a particle diameter of an active material.

The active material layer 13 includes an active material. The active material is a material serving as the subject of a battery reaction by occlusion and emission of lithium-ion. The active material is not specifically limited but may be properly considered in view of the conventional knowledge in the art. The cathode active material may include, for example, lithium-transition metal oxide such as $LiMn_2O_4$ or $LiNiO_2$, lithium-transition metal phosphate compound such as $LiFePO_4$, or lithium-transition metal sulfated compound. In some cases, two or more types of cathode active materials may be used together. Further, other cathode active materials may be used in addition to the above materials. Also, when the electrode is the anode, the active material layer contains an anode active material as the active material. The anode active material may include, for example, a carbon material such as graphite, soft or hard carbon, the lithium-transition metal compound mentioned above, a metallic material or lithium-metal alloy material. In some cases, two or more types of anode active materials may be used together. Moreover, other anode active materials may be used in addition to the above materials. An average particle diameter of the active material contained in the active material layer is not specifically limited. However, it is preferably within a range from 0.01 to 100 μm. In certain embodiments, a range from 1 to 50 μm for the average particle diameter is desirable, while in others a range from 1 to 20 μm is desirable. Other configurations outside or beyond such ranges may be employed. Additionally, in the specification, the expression "particle diameter" means a maximum distance L between any two points in a contour line of a particle such as that shown with respect to particle 2 shown in FIG. 2. A value of the average particle diameter is employed from a value calculated as an average value of the particle diameter of the particle observed among many views using observational means such as scanning electron microscopy (SEM) or transmission electron microscopy (TEM).

In the battery electrode 1 shown in FIG. 1, the cathode active material layer 13 contains a plurality (two or more types) of binders 14 having different specific gravities. The binders 14 are explained below in detail.

Also, the binders 14 are more present at the collector side in the cathode active material layer 13 of the battery electrode 1. The phrase "the binders are more present at the collector side" means that the binders 14 are much more present at the collector side based on a total mass of the binders 14 in the active material layer. In one configuration, a mass percentage of the binders 14 at a side closer to the collector 11 when the active material layer 13 is bisected in a surface parallel to the collector 11 is 50 mass % greater than a total amount of the binders.

The inventors herein sought a mechanism wherein an output characteristic deteriorates in the conventional battery. As a result, the inventors found the following mechanism. That is, the binders in an electrode slurry applied to the collector when manufacturing the electrode are first segregated at a surface side (side farther from the collector) of the active material layer at the time of drying the slurry, and an amount of the binders at a side closer to the collector is relatively reduced. Further, such segregation of the binder can be understood to be caused by a convection of a solvent from the collector side to the surface side involved with a vaporization of the solvent when drying the slurry. As such, the adhesiveness between the active material layer and the collector is deteriorated. When the battery is disposed at a high temperature for a long period of time, the output characteristic is deteriorated since the active material layer is peeled off from the collector. Based on such a theory, after repeated experiments, the inventors found that these problems can be resolved by employing the above constitution. That is, a battery constructed by using the battery electrode of the present embodiment has an excellent lifespan characteristic (cycle characteristic). Without being bound by theory, it is thought that such a feature results because when the binders are relatively more present around the collector, the adhesiveness between the active material layer and the collector is improved. The operational effects of the invention may be obtained regardless of the mechanism. Further, the inventors have found that the above problems of known batteries significantly occur when a high temperature endurance test is conducted on the electrode manufactured in accordance as previously known. Also, according to embodiments of the invention, it has been found that the deterioration of the output characteristic under a high temperature condition can be suppressed.

Here, the expression "the mass percentage of the binders at the side closer to the collector" means a value that when a total amount of the binders in the active material layer is set as 100 mass %, a mass of the binders at the side closer to the collector when the active material layer is bisected in the surface parallel to the collector as expressed with a percentage. For example, when the binders are present evenly throughout the entire active material layer, "the mass percentage of the binders at the side closer to the collector when the active material layer is bisected in the surface parallel to the collector" becomes 50 mass %. In such a case, "the mass percentage of the binders at the side farther from the collector when the active material layer is bisected in the surface parallel to the collector" also becomes 50 mass %. Further, when three fourths of the binders in the active material layer are present at the side closer to the collector, "the mass percentage of the binders at the side closer to the collector when the active material layer is bisected in the surface parallel to the collector" becomes 75 mass %. In such a case, since one fourths of the binders are present at the side farther from the collector, "the mass percentage of the binders at the side farther from the collector when the active material layer is bisected in the surface parallel to the collector" becomes 25 mass %.

The mass percentage of the binders at the side closer to the collector when the active material layer is bisected in the surface parallel to the collector is preferably, but not necessarily, greater than 50 mass % and equal to or less than 70 mass %. According to certain embodiments, this mass percentage is within a range from 60 to 70 mass %, while in others it is more preferably within a range from 60 to 65 mass %. According to such a configuration, it is possible to obtain the operational effect of the present invention, i.e., improve the adhesiveness between the collector and the active material layer while securing a bonding property somewhat evenly throughout the entire active material layer. Further, an image analysis using SEM or EP-SIM is used for determining whether or not the binders are more present at the collector side and/or calculating the above mass percentage. As one example, in a preferred configuration, when the thickness of the active material layer 13 is greater than 20 μm, the mass percentage of the binders 14 in an area having a distance of up to 10 μm from the collector 11 is preferably within a range from 50 to 70 mass %, and more preferably within a range from 60 to 70 mass %. Also, the mass percentage of the binders 14 in the area having a distance of up to 10 μm from the collector 11 can be obtained by the above method.

The binders 14 are not specifically limited but may be properly adjusted in view of the conventional knowledge in the art. Here, available binders are listed with their specific gravities, as follows: styrene butadiene rubber (SBR) (specific gravity: 0.9 g/cm$^3$); acrylic resin (specific gravity: 1.2 g/cm$^3$); polyvinylidene fluoride (PVDF) (specific gravity: 1.8 g/cm$^3$); polytetrafluoroethylene (PTFE) (specific gravity: 1.8 g/cm$^3$); polyimide (PI) (specific gravity: 1.4 g/cm$^3$); and fluororubber (specific gravity: 1.6 g/cm$^3$). Further, the values of the specific gravities of the binders are employed from values obtainable by a gaseous substitution method.

In one preferred embodiment, the binder 14 having the greatest specific gravity among the plurality of the binders in the cathode active material layer 13 is more present at the collector side. This means that more than 50 mass % of the binder 14 having the greatest specific gravity among the plurality of the binders (preferably within a range from 50 to 70 mass % and more preferably within a range from 50 to 60 mass %) is present at the collector side of the cathode active material layer 13. According to such a configuration, it is possible to manufacture embodiments of the invention with a much simpler method, and the operational effect of improving the adhesiveness between the collector and the active material layer can be exhibited.

In another preferred embodiment, any one binder 14, among the plurality of the binders 14 in the cathode active material layer 13, has a specific gravity greater than or equal to 1.9 to 5 times that of another binder 14. This means that when there are only two types of binders, a ratio between the two binders are within a range of 1.9 to 5 times. Further, this also means that when any two types of binders (among three or more types of binders) are selected, and a ratio of the specific gravities is calculated, there is at least one set of a combination within such a range. According to such a configuration, the binder having a greater specific gravity is present at the collector side. Thus, it becomes possible to improve the lifespan characteristic (cycle characteristic). Other acceptable ranges for the ratio of specific gravities are, without limitation, 1.9 to 4 and 2 to 3.

Here, if the mass percentage of the binders in the collector side is set to be greater, then the number of contact points between the binders and the collector is increased. Further, since the binders are nonconductors (without any conductivity), resistance components around the collector may be increased to thereby deteriorate the battery performance. As such, in embodiments of the invention, the average particle diameter of the binder having a greater specific gravity may be set to be smaller than or at least equal to that of the binder having a smaller specific gravity. For example, the average particle diameter of any one binder 14 in the cathode active material layer 13 is 0.5 to 1 time of that of another binder 14 having a smaller specific gravity. Other diameters, such as 0.5 to 0.8 times, and more preferably 0.5 to 0.7 times, are possible. By employing such a configuration, the contact points become less between more binders, which have a greater specific gravity around the collector, and the collector. The increase of the resistance component around the collector involved to the increase of the mass percentage of the binders can be suppressed. As a result, it becomes possible to improve the lifespan characteristic by improving the adhesiveness between the collector and the active material layer while effectively preventing the battery performance. Also, although the average particle diameter of the binder, regardless of its specific gravity, is not specifically limited, the average particle diameter of the binder having a greater specific gravity is preferably within a range from 100 to 500 nm, more preferably within a range from 100 to 300 nm, and even more preferably within a range from 200 to 300 nm. The average particle diameter of the binder having a smaller specific gravity is preferably within a range from 50 to 500 nm, more preferably within a range from 50 to 300 nm, and even more preferably within a range from 50 to 200 nm.

It is possible to allow more binders at the collector side by including two or more types of binders having different specific gravities as above in the active material layer. This feature can be explained with a Stokes formula relating to the terminal or settling velocity of the particle dropping through the fluid (see Formula 1 below). Here, a binder particle corresponds to the "particle" and the solvent of the active material slurry when manufacturing the active material layer corresponds to the "fluid."

$$v_s = \frac{D_p^2 (\rho_p - \rho_f) g}{18\eta} \quad (1)$$

In the above formula, $v_s$ is the terminal velocity of the particle, $D_p$ is the particle diameter, $\rho_p$ is the specific gravity of the particle, $\rho_f$ is the specific gravity of the fluid, g is the acceleration of gravity and $\eta$ is a viscosity of the fluid. Although this is a formula applying generally to spherical particles, it provides a good approximation for non-spherical shapes in this application.

As can be understood from the formula, assuming that the solvents in the active material slurries are the same, if the diameters of the binder particles are identical, then the terminal velocity is faster as the specific gravity of the binder particle becomes greater. Thus, if the slurry including the binders having different specific gravities is applied to the collector, then the binder having a greater specific gravity and faster terminal velocity ("first binder") relatively moves in a lower direction. Further, the binder having a smaller specific gravity and slower terminal velocity ("second binder") relatively stays in an upper direction. As a result, it becomes possible to allow much more binders at the collector side. As described below, the particle diameter of the first binder having a greater specific gravity is set to be smaller. From the Stokes formula, it is understood that a square of the particle diameter of the binder particle is in an inverse proportion to the specific gravity of the binder particle. As such, when a difference in the specific gravity between the first binder and the second binder is smaller, if the particle diameter of the first binder is extremely small, then the terminal velocity does not become faster. Rather, it becomes slower than the terminal velocity of the second binder. Given the above, the first binders having a greater specific gravity are not allowed to be abundantly present around the collector. Thus, when the difference in the specific gravity between the first binder and the second binder is smaller, great care needs to be taken not to establish the particle diameter of the first binder to be significantly smaller. However, when the difference in the specific gravity between the first binder and the second binder is greater, although the particle diameter of the first binder is set somewhat smaller, the terminal velocity of the first binder can be still maintained to be greater than that of the second binder. At any rate, when the particle diameter of the binder is controlled, it is possible to obtain a desired terminal velocity and to arrange the binders in the active material layer by considering the effects expressed by the Stokes formula.

When considering the above, it is preferable to employ a combination of the binders having a greater difference in the specific gravities. Desirable combinations include a combination of SBR and PTFE, a combination of SBR and PVDF, and a combination of PVDF and fluororubber. According to the combination having the greater difference in specific gravities, it is possible to establish the particle diameter of the first binder having a greater specific gravity (e.g., PTFE) to be sufficiently smaller than the second binder (e.g., SBR). Further, it is desirable to simultaneously dissolve the binders in the solvent within the slurry. For example, SBR is soluble in water but insoluble in N-methyl-2-prolydone (NMP). Thus, when SBR is used, a binder soluble in water is preferably selected as another binder (e.g., PTFE or PVDF). As a result, it becomes possible to securely allow the first binder having a greater specific gravity around the collector. By doing so, the adhesiveness between the collector and the active material layer can be better improved. Further, when the above desirable combinations are used, a binder may be used in addition to the above binders.

Although the active material layer of the electrode includes a plurality of the binders (i.e., two, three or more types), a preferred embodiment includes two types of binders. According to such a configuration, it becomes economically profitable due to reducing the number of binders or the number of processes in the manufacturing process. Moreover, it facilitates dispersal in view of the technical constitution.

The active material layer 13 may contain other components if necessary. The other components may include, for example, a conductive auxiliary agent and/or electrolyte.

A conductive auxiliary agent is an additive blended in order to improve the conductivity in the active material layer. The conductive auxiliary agent may include carbon black such as acetylene back or ketjen black. Alternatively, it may include carbon material such as carbon nanofiber, carbon nano tube, vapor grown carbon fiber, active carbon or graphite. An average particle diameter of the conductive auxiliary agent is not specifically limited.

When the active material layer contains an electrolyte, the conductivity of the lithium-ion in the active material layer is improved. Any type of electrolytes may be included in the active material layer. Since the electrolyte may be the same as constituting an electrolyte layer as is known, detailed explanations thereof are omitted herein.

Amounts of each component in the active material layer are not specifically limited but may be properly adjusted in view of the conventional knowledge in the art. The thickness of the active material layer is not specifically limited but may be properly adjusted in view of the conventional knowledge in the art.

A method of manufacturing a battery electrode incorporating the electrode 1 is not specifically limited but may be properly adjusted in view of the conventional knowledge in the field of manufacturing battery electrodes. Hereinafter, one exemplary method of manufacturing the battery electrode is explained where the electrode 1 is the cathode for a lithium-ion secondary battery.

The collector 11 is first prepared as explained above.

The cathode active material slurry for forming the cathode active material layer 13 is then produced. Specifically, the cathode active material slurry is produced by preparing components capable of being contained in the active material layer in a predetermined amount, adding them into a slurry viscosity adjusting solvent and then stirring them. The cathode active material slurry may contain the cathode active material, the binders 14 having different specific gravities and additives such as the conductive auxiliary agent and the electrolyte if desirable. Since the specific configurations of each component have been explained above, detailed explanations thereof are omitted herein. Further, the terminal velocity of the binder particle described above may vary depending on the specific gravity of the slurry viscosity adjusting solvent (corresponding to the above "$\rho_f$"). As such, it is possible to control the terminal velocity when the binder particle drops among the solvent by properly selecting the type of the slurry viscosity adjusting solvent. The slurry viscosity adjusting solvent is not specifically limited but may include polar solvents such as water, NMP, dimethylformamide, dimethylacetamide, methylformamide and the like. A viscosity of the slurry can be adjusted by controlling an amount of adding the solvents. Although the viscosity of the slurry is not specifically limited, it is desirably within a range from 1000 to 50000 mPa·s and preferably within a range from 2000 to 25000 mPa·s.

Thereafter, a coated film is formed by coating the produced cathode active material slurry on the surface of the collector 11. The coated film is then dried. If necessary, a pressing treatment may be executed. By doing so, the cathode (i.e., electrode 1) for the lithium-ion secondary battery is produced. The amount of slurry coated, the method of coating the slurry, and the conditions for drying or pressing the coated film are not specifically limited and may be properly adjusted in view of the conventional knowledge in the art. The amount of slurry coated may be controlled such that the thickness of the active material layer 13 is within the ranges described previously. Further, a temperature for drying the slurry can be, for example, within a range from 60 to 150° C. In some embodiments, the temperature is preferably within a range from 80 to 120° C. Also, the duration for drying the slurry depends on the thickness of the electrode and is generally within a range from 5 to 30 minutes and preferably within a range from 5 to 10 minutes for the thickness ranges described by example herein. Additionally, since the pressing condition may vary depending on the desired thickness of the active material layer, a pressing pressure or pressing time may be set in view of the conventional knowledge in the art upon considering a target thickness.

Further, when the electrolyte can be cross-linked by heat or light, the electrolyte may be cross-linked by establishing a separate heating or light radiating process. The electrolyte may be cross-linked by heating in the drying process. Also, when the electrolyte is cross-linkable, it is preferable to add a conventional thermal polymerization initiator or light polymerization initiator into the cathode active material slurry beforehand.

According to such a manufacturing method, since the electrode can be manufactured with a very simple process, it is clearly advantageous and desirable. Moreover, unlike electrodes manufactured by repeating the coating and drying processes, there is no interface in the active material layer 13 except for that associated with the slurries containing different binders. Although such an interface may cause an increase of the electrical resistance in an electrode reaction, such a concern for the increase of the electrical resistance can be decreased according to the electrode manufactured by the manufacturing method of the present embodiment.

The battery electrode so manufactured is used for constituting a battery. That is, another configuration of the invention provides a battery having a cathode, an anode and an electrolyte layer interposed between the cathode and anode. Further, although it is preferable that both of the cathode and anode are battery electrodes as described in the above embodiments, the desired operational effects can be obtained by a battery constructed through employing a battery electrode as taught herein to either the cathode or anode.

The battery comprising embodiments of the invention is not specifically limited to a lithium-ion secondary battery, although the present embodiment discloses such a battery.

The battery may rather be a nickel hydride secondary battery, a sodium ion secondary battery, a potassium ion secondary battery, a nickel cadmium secondary battery and the like. Further, when the battery is classified in terms of structure or configuration, the battery is not specifically limited and may include a stacked type (flat type) battery and a rolled type (cylinder type) battery. It may even be applied to any conventional structure.

Likewise, although the battery is classified according to the configuration of the electrolyte of the lithium-ion secondary battery, the battery is not specifically limited. For example, the battery may be applied to any one of a liquid electrolyte type battery impregnating an electrolytic solution into a separator, a polymer gel electrolyte type battery (polymer battery) and a polymer solid electrolyte (all-solid electrolyte) battery. The polymer gel electrolyte and the polymer solid electrolyte may be used individually or after being impregnated into the separator.

The stacked type battery, which is the general configuration of the lithium-ion secondary battery, is explained below.

Figure 3:
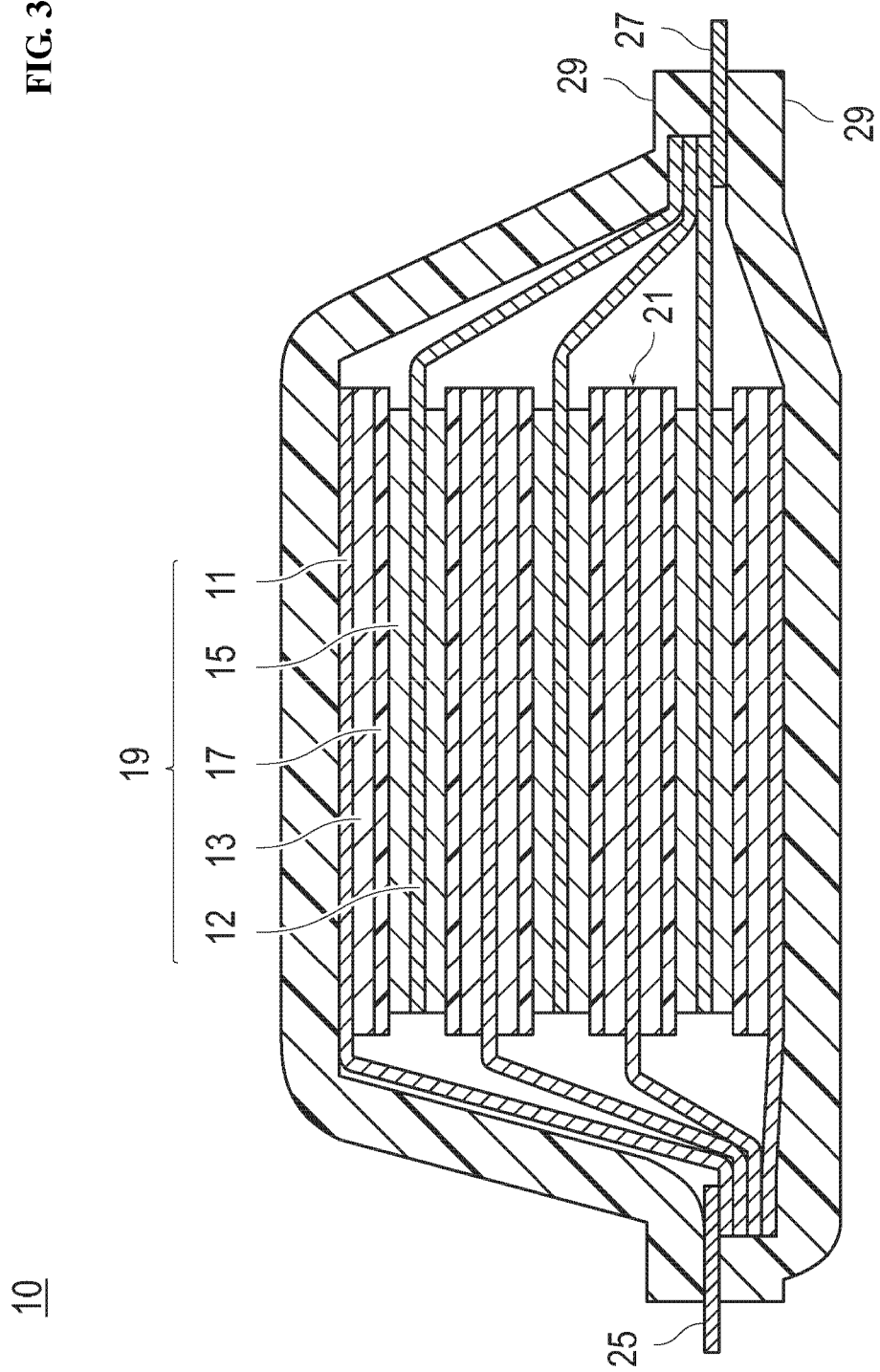
FIG. 3 is a cross-sectional view of a stacked type lithium-ion secondary battery in accordance with one embodiment of the invention.

FIG. 3 is a cross-sectional diagram schematically showing a structure of a stacked type lithium-ion secondary battery as one example of the present embodiment. As shown in FIG. 3, the lithium-ion secondary battery 10 has a configuration wherein a battery element 21 is sealed within a laminate sheet, or film, 29. The battery element 21 has an approximately rectangular shape and is directed to performing charge/discharge reactions, and the laminate film 29 is an outer casing. Specifically, the battery element 21 is housed and sealed by using a polymer-metallic composite laminate sheet as the outer casing of the battery and bonding the entire vicinity thereof via a thermal-fusion bonding process.

The battery element 21 has a configuration wherein the cathode has the cathode active material layer 13 at both surfaces of the cathode collector 11, and wherein an electrolyte layer 17 and the anode having an anode active material layer 15 at both surfaces of an anode collector 12 are stacked. Specifically, since one cathode active material layer 13 faces the anode active material layer 15 adjacent thereto via an electrolyte layer 17, the cathode, the electrolyte layer and the anode are stacked in this order.

As such, the cathode, the electrolyte layer and the anode disposed adjacent to each other constitute one unit cell layer 19. Thus, the lithium-ion battery 10 may have a configuration wherein the unit cell layers 19 are stacked, thereby being electrically connected in parallel. Further, a sealing portion (an insulating layer) may be formed on outer circumferences of the unit cell layers 19 to insulate the cathode collector 11 and the anode collector 12, which are adjacent to each other. Although a cathode active material layer 13 is disposed on only one surface of each of the outermost cathode collectors 11 positioned at both outermost layers of the battery element 21, the active material layers 13 may be disposed on both surfaces. The cathode and anode can be reversely disposed from that shown in FIG. 3 so that the outermost anode collectors 12 are positioned at both outermost layers of the battery element 21. In this case, the anode active material layers 15 can be disposed on only one surface of the outermost anode collectors 12.

The cathode collector 11 and the anode collector 12 have a configuration wherein a cathode collecting plate 25 and an anode collecting plate 27 conducting with each electrode (cathode and anode) are inserted into an end of the laminate film 29 to thereby protrude toward the outside of the laminate film 29. The cathode collecting plate 25 and the anode collecting plate 27 may be disposed on the cathode collector 11 and the anode collector 12 of each electrode via a cathode lead and an anode lead (not shown) by using an ultrasonic welding or resistance welding process.

The lithium-ion secondary battery 10 of the present embodiment uses the electrode as described above. Thus, the battery has an excellent lifespan characteristic (especially the cycle characteristic during high temperature endurance).

In the battery according to the present embodiment, conventional constitutional elements of a battery are used in addition to the inventive battery electrode. Although components for constituting the lithium-ion secondary battery are explained below, the technical scope of the invention is certainly not limited thereto.

The electrolytes forming the electrolyte layer 17 are not specifically limited. They may include a liquid electrolyte and a polymer electrolyte such as a polymer gel electrolyte and a polymer solid electrolyte.

The liquid electrolyte contains a lithium salt as a supporting salt dissolved in an organic solvent as a plasticizer. Examples of the organic solvent as the plasticizer include carbonates such as ethylene carbonate (EC), propylene carbonate (PC) and the like. Further, the supporting salt (lithium salt) can employ a compound such as $LiN(SO_2C_2F_5)_2$, $LiN(SO_2CF_3)_2$, $LiPF_6$, $LiBF_4$, $LiClO_4$, $LiAsF_6$, $LiSO_3CF_3$ and the like, which can be added to the active material layer of the electrode.

Also, the polymer electrolyte is classified into a gel polymer electrolyte (gel electrolyte) containing an electrolytic solution and a polymer solid electrolyte not containing the electrolytic solution.

The gel electrolyte is formed by injecting the liquid electrolyte into a matrix polymer having lithium-ion conductivity. Examples of the matrix polymer having lithium-ion conductivity include, but are not limited to, polyethylene oxides (PEO), polypropylene oxides (PPO) and copolymers thereof. Electrolytic salts such as lithium salts and the like are highly soluble in the matrix polymer.

Further, when the electrolyte layer 17 is formed of the liquid electrolyte or the gel electrolyte, a separator may be used in the electrolyte layer 17. A specific example of the separator may include a fine porous film formed of polyolefin such as polyethylene or polypropylene.

The polymer electrolyte has a configuration wherein a supporting salt (lithium salt) is dissolved in the matrix polymer and does not contain an organic solvent as the plasticizer. Thus, when the electrolyte layer 17 is formed of the polymer solid electrolyte, a liquid does not leak from the battery 10, thereby improving the reliability of the battery 10.

The matrix polymer of the polymer gel electrolyte or the polymer solid electrolyte forms a cross-linking structure, thus exhibiting excellent mechanical strength. In order to form the cross-linking structure, polymerization such as thermal polymerization, ultraviolet polymerization, radiation polymerization or electron beam polymerization is carried out on a polymer for forming the polymer electrolyte (e.g., PEO or PPO) by using a suitable polymerization initiator.

Further, the electrolyte may be contained in the active material layer of the inventive electrode embodiments taught herein as previously mentioned.

In order to extract a current to the outside of the battery 10, the collecting plates (cathode collecting plate 25 and anode collecting plate 27) electrically connected to each collector 11, 12 are extracted to the outside of the laminate film 29 (outer casing of battery 10).

Materials for forming the collecting plates 25, 27) are not specifically limited and may include conventional high conductive materials used for collecting plates for a lithium-ion battery. Materials for the collecting plates 25, 27 may include, for example, metallic materials such as copper, titanium, nickel, stainless steel (SUS) and an alloy thereof. More preferable materials include aluminum, copper and the like in view of a light weight, corrosion resistance and high conductivity. Further, the same material may be used for the cathode collecting plate 25 and the anode collecting plate 27, or different materials may be used. Also, the cathode collecting plate 25 and the anode collecting plate 27 may be produced by extending each collector, or separately prepared cathode and cathode collecting plates may be connected to each collector.

If needed, a cathode terminal lead and an anode terminal lead are used. For example, when the cathode collecting plate and the anode collecting plate, which become output electrode terminals, are directly extracted from each collector, the cathode terminal lead and the anode terminal lead may not be used.

Materials for the cathode terminal lead and the anode terminal lead may include those materials used for a terminal lead in a conventional lithium-ion battery. Further, it is preferable to coat a portion extracted from the laminate film 29 by a heat shrinkable tube with a heat resistant insulating property so that such a portion contacts a peripheral device or wirings, thus being electrically leaked not to thereby affect a product (e.g., vehicular components, and particularly an electronic machine).

In addition to a conventional metallic can case, an outer casing of the battery 10 may include a case with a pocket shape using the laminate film 29 including aluminum capable of covering the battery element 21. The laminate film 29 may include, for example, a three-layered laminate film formed of polypropylene, aluminum and nylon stacked in that order. However, it is certainly not limited thereto although it is preferable to employ a laminate film with excellent output and cooling performance and that is appropriately available to the battery for large-sized devices such as EV, HEV and the like.

When the battery is a lithium-ion secondary battery, the battery may further be a bipolar battery.

Figure 4:
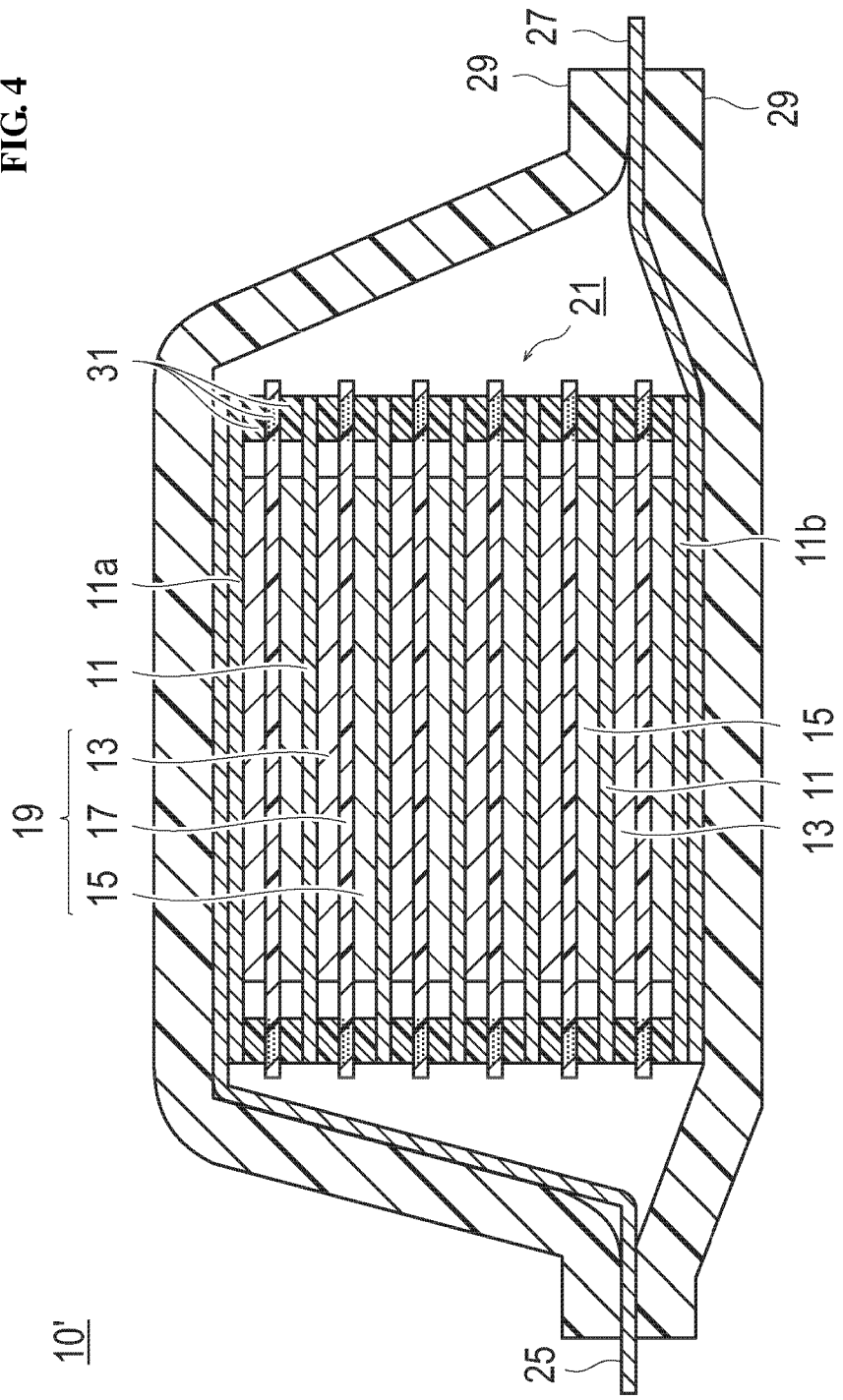
FIG. 4 is a cross-sectional view of a bipolar battery in accordance with one embodiment of the invention.

FIG. 4 is a cross-sectional diagram schematically showing an entire structure of the bipolar battery 10' in accordance with one embodiment of the invention. However, the technical scope of the invention is certainly not limited to such a configuration.

The bipolar battery 10' of the embodiment shown in FIG. 4 has a structure wherein the approximately rectangular battery element 21 directed to performing charge/discharge reactions is sealed within the laminate film 29, which is the outer casing of the battery 10'.

As shown in FIG. 4, the battery element 21 of the bipolar battery 10' of the present embodiment has a plurality of bipolar electrodes. The bipolar electrode has the cathode active material layer 13 electrically coupled to one surface of a collector 11 and the anode active material layer 15 electrically coupled to the other surface of the collector 11. Each bipolar electrode is stacked via the electrolyte layer 17 to thereby form the battery element 21. Further, the electrolyte layer 17 has a configuration wherein the electrolyte is maintained at a center portion in a surface direction of the separator as a base. At this time, each bipolar electrode and the electrolyte 17 are stacked upon one another such that the cathode active material layer 13 of one bipolar electrode faces the anode active material layer 15 of an adjacent bipolar electrode via the electrolyte layer 17. That is, the electrolyte layer 17 is interposed between the cathode active material layer 13 of one bipolar electrode and the anode active material layer 15 of another bipolar electrode adjacent to the one bipolar electrode.

The cathode active material layer 13, electrolyte layer 17 and anode active material layer 15 disposed adjacent to each other constitute one unit cell layer 19. Thus, the bipolar battery 10' has a configuration wherein the unit cell layers 19 are stacked upon one another. Additionally, sealing portions 31 are formed on outer circumferences of the unit cell layers 19 in order to prevent leakage of the electrolytic solution from the electrolyte layer 17 due to electric leakage. A short-circuit by the contact between the adjacent electrodes can be prevented by insulating the adjacent electrodes 11 by disposing the sealing portions 31. Further, in this embodiment, the cathode active material layer 13 is formed on only one surface of the outermost collector 11a at the cathode side positioned at the outermost layer of the battery element 21. Also, the anode active material layer 15 is formed on only one surface of the outermost collector 11b at the anode side positioned at the outermost layer of the battery element 21. The cathode active material layer 13 may be formed at both surfaces of the outermost collector 11a at the cathode side. Likewise, the anode active material layer 15 may be formed on both surfaces of the outermost collector 11a at the anode side.

Further, in the bipolar secondary battery 10' shown in FIG. 4, the cathode collecting plate 25 is disposed so as to be adjacent to the outermost collector 11a at the cathode side and is extended to thereby be extracted from the laminate film 29, which is the outer casing of the battery 10'. Likewise, the anode collecting plate 27 is disposed so as to be adjacent to the outermost collector 11b at the anode side and is extended to thereby be extracted from the laminate film 29.

In the bipolar battery 10', the sealing portion 31 is typically formed around each of the unit cell layers 19. The sealing portions 31 are formed to prevent short circuit caused by any contact between adjacent collectors 11 within the battery 10' or a slight misalignment between ends of the unit cell layers 19 in the battery element 21. The long-term reliability and safety of the battery 10' are secured by disposing the sealing portions 31 to thereby provide the high-quality bipolar battery 10'.

It is desirable that the sealing portions 31 have insulation properties, seal efficiency (sealing properties) against the separation of the solid electrolyte or moisture infiltration from the outside and thermal resistance at a battery-operating temperature. Examples of a material for the sealing portions 31 may include urethane resins, epoxy resins, polyethylene resins, polypropylene resins, polyimide resins, rubbers and the like. In particular, polyethylene resins or polypropylene resins are preferred, but not necessary, as the materials of the sealing portions 31 in view of corrosion resistance, chemical resistance, simple production (film forming performance) and economic efficiency.

Higher output can be obtained by such a bipolar battery 10' compared to the stacked type battery 10.

Figure 5:
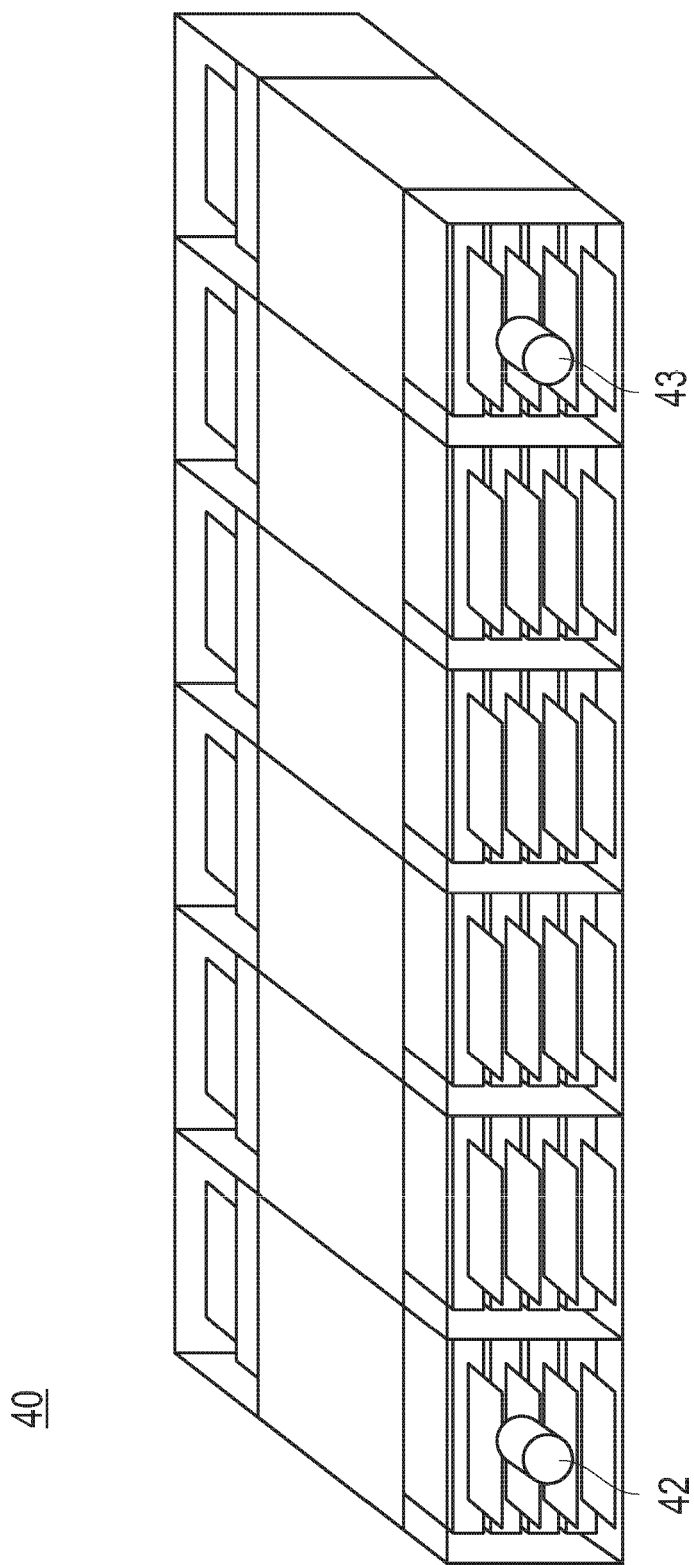
FIG. 5 is a perspective view of a battery assembly in accordance with one embodiment of the invention.

Embodiments of the invention also encompass battery assemblies formed by electrically connecting the batteries 10', 10. FIG. 5 is a perspective view of a battery assembly according to one embodiment of the present invention.

As shown in FIG. 5, a battery assembly 40 is formed by connecting a plurality of the lithium-ion secondary batteries. Each of the lithium-ion secondary batteries is connected to one another by connecting the cathode collecting plate and the anode collecting plate of the lithium-ion secondary batteries via a bus bar. Electrode terminals 42 and 43 are formed as electrodes of the entire battery assembly 40 at one side of the battery assembly.

Connection of the lithium-ion secondary batteries for constituting the battery assembly 40 can be suitably performed by any known method without being limited to a particular method. For example, welding such as ultrasonic welding and spot welding, or fastening by means of rivets or caulking, can be employed. According to such methods, it is possible to improve the long-term reliability of the battery assembly 40.

According to the battery assembly of the present embodiment, it is possible to provide the battery assembly with an excellent lifespan characteristic since the battery assembly is prepared by using the inventive lithium-ion secondary batteries. That is, it is possible to provide a battery assembly with an excellent cycle characteristic under high temperature conditions.

The batteries constituting the battery assembly may be connected only in parallel, only in series or in a combination thereof.

Embodiments of the battery taught herein may be mounted on a vehicle, for example, in a form of the above-described battery assembly. A battery mounted on the vehicle may be used, for example, as a power source for driving a motor of the vehicle.

Vehicles using the battery or battery assembly as a power source for a motor may include vehicles driving wheels by the motor, for example, an electric car not using gasoline, hybrid cars such as series or parallel hybrid cars, and fuel-cell cars and the like.

Figure 6:
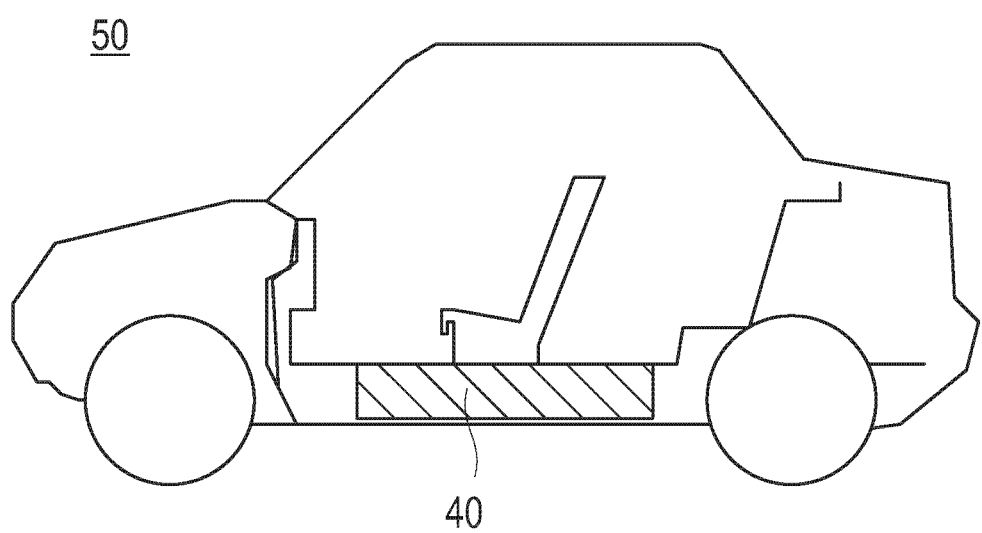
FIG. 6 is a diagram of a vehicle equipped with the battery assembly according to FIG. 5.

FIG. 6 is a diagram of a vehicle 50 equipped with the battery assembly 40. The battery assembly 40 mounted on the vehicle 50 has the characteristics explained above. As such, a long term reliability of the vehicle 50 can be improved by mounting the battery assembly 40 on the vehicle 50.

Effects of the invention are explained using the following examples and comparison examples. However, the technical scope of the invention is not limited to the examples below.

Production of Cathode (1)

A cathode active material slurry is prepared by adding water as a slurry viscosity adjusting solvent with a predetermined amount into a solid content formed of 85 mass % of lithium iron phosphate (LiFePO$_4$) with D50=2.9 μm (average particle diameter) as a cathode active material, 5 mass % of Super-P (manufactured by "TIMCAL") as a conductive auxiliary agent, 5 mass % of polytetrafluoroethylene (PTFE) with 1.8 g/cm$^3$ of specific gravity and 190 nm of average particle diameter as a first binder, and 5 mass % of styrene butadiene rubber (SBR) with 0.92 g/cm$^3$ of specific gravity and 200 nm of average particle diameter as a second binder.

A basis weight of 5.0 mg/cm$^2$ of this cathode active material slurry is applied on one surface of aluminum foil having a thickness of 20 μm as a cathode collector and then dried at a temperature of 80° C. for 15 minutes to thereby obtain a stacked body. The stacked body is then pressed by using a presser such that a thickness of the cathode active material layer becomes 25 μm. The collecting plate is connected to the collector, thereby producing cathode (1).

Production of Cathode (2)

A cathode active material slurry is prepared by adding water as a slurry viscosity adjusting solvent with a predetermined amount into a solid content formed of 85 mass % of lithium iron phosphate (LiFePO$_4$) with D50=2.9 μm (average particle diameter) as a cathode active material, 5 mass % of Super-P (manufactured by "TIMCAL") as a conductive auxiliary agent, 5 mass % of polytetrafluoroethylene (PTFE) with 1.8 g/cm$^3$ of specific gravity and 200 nm of average particle diameter as a first binder, and 5 mass % of styrene butadiene rubber (SBR) with 0.92 g/cm$^3$ of specific gravity and 200 nm of average particle diameter as a second binder.

A basis weight of 5.0 mg/cm$^2$ of this cathode active material slurry is applied on one surface of aluminum foil having a thickness of 20 μm as a cathode collector and then dried at a temperature of 80° C. for 15 minutes to thereby obtain a stacked body. The stacked body is then pressed by using a presser such that a thickness of the cathode active material layer becomes 25 μm. The collecting plate is connected to the collector, thereby producing cathode (2).

Production of Cathode (3)

A cathode active material slurry is prepared by adding water as a slurry viscosity adjusting solvent with a predetermined amount into a solid content formed of 85 mass % of lithium iron phosphate (LiFePO$_4$) with D50=2.9 μm (average particle diameter) as a cathode active material, 5 mass % of Super-P (manufactured by "TIMCAL") as a conductive auxiliary agent, 5 mass % of polytetrafluoroethylene (PTFE) with 1.8 g/cm$^3$ of specific gravity and 250 nm of average particle diameter as a first binder, and 5 mass % of styrene butadiene rubber (SBR) with 0.92 g/cm$^3$ of specific gravity and 200 nm of average particle diameter as a second binder.

A basis weight of 5.0 mg/cm$^2$ of this cathode active material slurry is applied on one surface of aluminum foil having a thickness of 20 μm as a cathode collector and then dried at a temperature of 80° C. for 15 minutes to thereby obtain a stacked body. The stacked body is then pressed by using a presser such that a thickness of the cathode active material layer becomes 25 μm. The collecting plate is connected to the collector, thereby producing cathode (3).

Production of Cathode (4)

A cathode active material slurry is prepared by adding water as a slurry viscosity adjusting solvent with a predetermined amount into a solid content formed of 85 mass % of lithium iron phosphate (LiFePO$_4$) with D50=2.9 μm (average particle diameter) as a cathode active material, 5 mass % of Super-P (manufactured by "TIMCAL") as a conductive auxiliary agent, 5 mass % of polytetrafluoroethylene (PTFE) with 1.8 g/cm$^3$ of specific gravity and 200 nm of average particle diameter as a first binder, 5 mass % of styrene butadiene rubber (SBR) with 0.92 g/cm$^3$ of specific gravity and 200 nm of average particle diameter as a second binder, and acrylic resin with 1.2 g/cm$^2$ of specific gravity and 200 nm of average particle diameter as a third binder.

A basis weight of 5.0 mg/cm$^2$ of this cathode active material slurry is applied on one surface of aluminum foil having a thickness of 20 μm as a cathode collector and then dried at a temperature of 80° C. for 15 minutes to thereby obtain a stacked body. The obtained stacked body is then pressed by using a presser such that a thickness of the cathode active material layer becomes 25 μm. The collecting plate is connected to the collector, thereby producing cathode (4).

Production of Cathode (5)

The cathode (5) is produced according to the same method as in "Production of cathode (1)," in addition to using 10 mass % of styrene butadiene rubber (SBR) with 0.92 g/cm$^3$ of specific gravity and 200 nm of average particle diameter as a binder added to the cathode active material slurry.

Production of Anode

An anode active material slurry is prepared by adding N-methyl-2-pidolidon as a slurry viscosity adjusting solvent with a predetermined amount into a solid content formed of 86 mass % of lithium titanate ($Li_4Ti_5O_{12}$) with D50=10 μm (average particle diameter) as an anode active material, 4 mass % of Super-P (manufactured by "TIMCAL") as a conductive auxiliary agent, and 10 mass % of polyvinylidene fluoride (PVDF) with 200 nm of average particle diameter as a second binder.

A basis weight of 5.0 mg/cm² of this anode active material slurry is applied on one surface of copper foil having a thickness of 10 μm as an anode collector and then dried at a temperature of 80° C. for 15 minutes to thereby obtain a stacked body. The stacked body is then pressed by using a presser such that a thickness of the anode active material layer becomes 22 to 25 μm. The collecting plate is connected to the collector, thereby producing the anode.

Preparation of the Electrolyte Layer

Polyethylene oxide with a weight-average molecular weight of 8000 is prepared as a matrix polymer of the electrolyte. LiBETI as a lithium salt is dissolved in the prepared polyethylene oxide such that [O]:[Li]=20, thereby preparing a polymer solid electrolyte for constituting the electrolyte layer.

First Example

The cathode (1), the electrolyte layer and the anode produced as above are stacked such that the active material layers at both sides face each other, thereby manufacturing a unit cell of the lithium-ion secondary battery.

Second Example

The cathode (2), the electrolyte layer and the anode produced as above are stacked such that the active material layers at both sides face each other, thereby manufacturing a unit cell of the lithium-ion secondary battery.

Third Example

The cathode (3), the electrolyte layer and the anode produced as above are stacked such that the active material layers at both sides face each other, thereby manufacturing a unit cell of the lithium-ion secondary battery.

Fourth Example

The cathode (4), the electrolyte layer and the anode produced as above are stacked such that the active material layers at both sides face each other, thereby manufacturing a unit cell of the lithium-ion secondary battery.

Comparison Example

The cathode (5), the electrolyte layer and the anode produced as above are stacked such that the active material layers at both sides face each other, thereby manufacturing a unit cell of the lithium-ion secondary battery.

Charging and Discharging Cycle Test

As to the unit cells manufactured in accordance with the first to fourth examples and the comparison example, a charging and discharging cycle test for 10 cycles and 30 cycles under a high temperature condition (80° C.) is conducted. Further, the cycle condition is set such that one cycle is set as a charging process (CC) for 0.2 C→a discharging process (DC) for 0.2 C. As to each of 10 cycles and 30 cycles, a capacity maintenance ratio (%) is set by calculating the percentage of a discharging capacity at the time of each cycle against a discharging capacity at the time of one cycle. Results of the charging and discharging cycle test are indicated in Table 1 below.

TABLE 1

| | Electrode | Ratio of specific gravities of binders (first binder/ second binder) | Ratio of specific gravities of binders (first binder/ third binder) | Ratio of binder particle diameters (first binder/ second binder) | Ratio of binder particle diameters (first binder/ third binder) | Mass percentage of binder at side closer to collector (%) | Capacity maintenance ratio (%) 10 cycles | Capacity maintenance ratio (%) 30 cycles |
|---|---|---|---|---|---|---|---|---|
| First Example | Cathode (1)/anode | 1.96 | — | 0.95 | — | 57 | 62 | 48 |
| Second Example | Cathode (2)/anode | 1.96 | — | 1 | — | 60 | 59 | 42 |
| Third Example | Cathode (3)/anode | 1.96 | — | 1.25 | — | 62 | 52 | 37 |
| Fourth Example | Cathode (4)/anode | 1.96 | 1.5 | 0.95 | 0.95 | 55 | 60 | 50 |
| Comparison Example | Cathode (5)/anode | — | — | — | — | 45 | 28 | 26 |

From the results in Table 1, it can be understood that in the batteries (single cell) of the first to fourth examples, the capacity maintenance ratios are highly maintained in any of 10 cycles and 30 cycles compared to the comparison example. Thus, it becomes apparent that durability (lifespan characteristic) under a high temperature condition can be significantly improved by allowing much more binders at the collector side by adding a plurality of binders having different specific gravities in the active material layer of the electrode.

Peel Strength Test

In order to survey a peel strength of the cathode (2) used in the second example, the cathode (4) used in the fourth example and the cathode (5) used in the comparison example, a cross-cut adhesion test is conducted based on JIS H8602 4. 7 (1988). Specifically, 100 cross-cut adhesions are formed on the surface of the cathode active material layer in an interval of 1 mm by using the blade of a single-edged razor blade and an adhesive tape is adhered thereon and then peeled off instantly. At this time, the number of cross-cut adhesions remaining after the peeling is calculated as adhesion strength.

TABLE 2

|  | Adhesion strength |
| --- | --- |
| Cathode (2) (second example) | 92/100 |
| Cathode (4) (fourth example) | 88/100 |
| Cathode (5) (fifth example) | 71/100 |

From the results in Table 2, it can be understood that the adhesive strength of the cathode (2) used in the second example and the cathode (4) used in the fourth example are significantly improved compared to the cathode (5) used in the comparison example. Further, the adhesive strength of the cathode (4) is slightly lower than that of the cathode (2) since the cathode (4) contains the first binder having the greatest specific gravity.

From the above, it can be understood that in cathodes (1) to (4) used in each example, since the binders are relatively more present at the collector side, the adhesion strength between the active material layer and the collector is improved. Further, it is assumed that such an improvement of the adhesion strength improves the lifespan characteristic (cycle characteristic) under the high temperature condition.

As such, the battery electrode according to the present embodiment can effectively improve the lifespan characteristic of the battery (particularly the cycle characteristic at the time of the high temperature endurance).

The above described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. A battery electrode comprising:
   a collector; and
   an active material layer formed on a surface of the collector, wherein the active material layer includes a plurality of binders having different specific gravities and being more present at a collector side in the active material layer, the plurality of binders comprising:
     a first binder having a first specific gravity and a first average particle diameter; and
     a second binder having a second specific gravity and a second average particle diameter, wherein the first specific gravity is greater than the second specific gravity, the first average particle diameter is smaller than the second average particle diameter, and the second binder has a greater settling velocity than the first binder, and wherein the first binder is more present at a collector side in the active material layer than the second binder.

2. The battery electrode of claim 1, wherein the first specific gravity of the first binder is 2 to 3 times greater than the second specific gravity of the second binder.

3. The battery electrode of claim 1, wherein the first average particle diameter of the first binder is 0.5 to 0.7 times the second average particle diameter of the second binder.

4. The battery electrode of claim 1, wherein each of the plurality of binders is fabricated from a material selected from a group consisting of polytetrafluoroethylene, polyvinylidene fluoride, styrene butadiene rubber and combinations thereof.

5. A battery comprising a cathode, an anode and an electrolyte layer interposed between the cathode and the anode, wherein at least one of the cathode and the anode constitutes the battery electrode of claim 1.

6. The battery of claim 5, wherein the battery is a lithium-ion secondary battery.

7. An assembled battery using the battery of claim 5.

8. A vehicle equipped with the battery of claim 5 as a power source for driving an electrical motor.

9. The battery electrode of claim 1, wherein the first binder and the second binder are soluble in water.

10. A method of manufacturing a battery electrode, comprising:
    producing an electrode active material slurry comprising a plurality of binders, wherein a first binder of the plurality of binders has a greater specific gravity than a second binder of the plurality of binders;
    controlling a particle size of the first binder such that the average particle size of the first binder is smaller than the average particle size of the second binder, wherein the second binder has a greater settling velocity than the first binder;
    forming a coated film by coating the electrode active material slurry in an active material layer on a surface of a collector; and
    drying the coated film such that the first binder is more present at a collector side in the active material layer in comparison to the second binder.

11. The method of claim 10, wherein the average particle diameter of the first binder is 0.5 to 0.7 times the average particle diameter of the second binder and the first specific gravity of the first binder is 2 to 3 times greater than the second specific gravity of the second binder.

12. The method of claim 10, wherein the slurry includes water as a solvent and the plurality of binders are soluble in water.

13. A battery electrode comprising:
    a collector; and
    an active material layer formed on a surface of the collector and including a plurality of binders comprising:
      a first binder having a first specific gravity and a first average particle diameter; and
      a second binder having a second specific gravity and a second average particle diameter, wherein the first specific gravity is 2 to 3 times greater than the second specific gravity, the first average particle diameter is 0.5 to 0.7 times the second average particle diameter, and the second binder has a greater settling velocity than the first binder, and wherein the first binder is more present at a collector side in the active material layer than the second binder.

* * * * *